(12) United States Patent
You et al.

(10) Patent No.: US 11,840,089 B2
(45) Date of Patent: Dec. 12, 2023

(54) HEAD CLEANING DEVICE AND SUBSTRATE TREATING APPARATUS

(71) Applicant: SEMES CO., LTD., Chungcheongnam-do (KR)

(72) Inventors: Jae Hyun You, Cheonan-si (KR); Hun Sub Lim, Asan-si (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 0 days.

(21) Appl. No.: 17/394,803

(22) Filed: Aug. 5, 2021

(65) Prior Publication Data
US 2022/0040985 A1 Feb. 10, 2022

(30) Foreign Application Priority Data
Aug. 6, 2020 (KR) .......................... 10-2020-0098472

(51) Int. Cl.
*B41J 2/165* (2006.01)

(52) U.S. Cl.
CPC ......... *B41J 2/16552* (2013.01); *B41J 2/1652* (2013.01); *B41J 2002/16558* (2013.01)

(58) Field of Classification Search
CPC .................. B41J 2/16552; B41J 2/1652; B41J 2002/16558; B41J 2/16535
See application file for complete search history.

(56) References Cited

U.S. PATENT DOCUMENTS

| | | | |
|---|---|---|---|
| 7,506,959 B2 * | 3/2009 | Ueda .......................... | B41J 2/19 347/29 |
| 2019/0160821 A1 * | 5/2019 | Gencan ................... | B41J 2/1652 |
| 2022/0040982 A1 * | 2/2022 | You ...................... | B41J 2/16526 |

FOREIGN PATENT DOCUMENTS

| | | |
|---|---|---|
| JP | 2006289809 A | 10/2006 |
| KR | 1020090123859 A | 12/2009 |
| KR | 1020100030010 A | 3/2010 |
| KR | 1020130018970 A | 2/2013 |
| KR | 1020140038547 A | 3/2014 |
| KR | 10-2015-0076861 A | 7/2015 |
| KR | 10-2017-0114294 A | 10/2017 |

OTHER PUBLICATIONS

Korean Patent Office, Office action dated Feb. 18, 2023.

* cited by examiner

*Primary Examiner* — Sharon Polk
(74) *Attorney, Agent, or Firm* — Li & Cai Intellectual Property (USA) Office

(57) ABSTRACT

An inkjet head cleaning device includes a body; an ejection part formed in the body, and configured to eject a cleaning liquid to a nozzle surface of a head; and a suction part formed in the body, and configured to suck the cleaning liquid ejected from the ejection part and used for cleaning the nozzle surface of the head, and foreign substances separated from the nozzle surface of the head; and the ejection part includes a vertical passage through which the cleaning liquid flows and a discharge end at the end of the vertical passage and configured to guide the cleaning liquid to eject toward the suction part.

8 Claims, 10 Drawing Sheets

HEAD CLEANING DEVICE AND SUBSTRATE TREATING APPARATUS

CROSS-REFERENCE TO RELATED APPLICATIONS

A claim for priority under 35 U.S.C. § 119 is made to Korean Patent Application No. 10-2020-0098472 filed on Aug. 6, 2020, in the Korean Intellectual Property Office, the entire contents of which are hereby incorporated by reference.

BACKGROUND

Embodiments of the inventive concept described herein relate to a head cleaning device and a substrate treating apparatus including the same, and more particularly, to a head cleaning device that cleans a head that discharges a liquid in an inkjet manner, and a substrate treating apparatus including the same.

A liquid crystal display device that displays images includes two substrates, on which various thin films are deposited, and a liquid crystal layer interposed between the two substrates. In general, because the thin films formed on the substrates have patterns of various shapes, they are formed through deposition processes and photo etching processes for precision of the patterns. In this way, because the photo etching processes that use high-priced masks to form one thin film, manufacturing costs and manufacturing process time increase.

Recently, a thin film forming method using an inkjet printing manner has been used as an alternative to the conventional thin film forming method. Because a thin film is formed by applying a chemical to a specific location of a substrate according to the inkjet printing manner, a separate etching process is not required. The inkjet printing manner may be used to form a color filter or an alignment film of a liquid crystal display device.

In general, the inkjet printing apparatus includes a head that applies a chemical onto a substrate, and a cleaning device that cleans the head. The head includes a plurality of nozzles that discharges the chemical, and applies to a specific location of the substrate. In general, because the chemical used for the inkjet printing apparatus has a high viscosity and a high volatility, it is easily solidified. In particular, a chemical may reside around discharge holes of nozzles after the chemical is applied, and the residual chemical is solidified around the discharge holes to block the discharge holes of the nozzles or the residual chemical is applied to the substrate when the subsequent chemical is applied, so that an uneven film may be formed.

SUMMARY

Embodiments of the inventive concept provide a head cleaning device that may remove fine liquid crystals that reside on a head, and a substrate treating apparatus including the same.

Embodiments of the inventive concept also provide a head cleaning device that may improve an efficiency of a head cleaning process, and a substrate treating apparatus including the same.

The technical objectives of the inventive concept are not limited to the above-mentioned ones, and the other unmentioned technical objects will become apparent to those skilled in the art from the following description.

According to one aspect of exemplary embodiment, an inkjet head cleaning device comprising: a body; an ejection part formed in the body and configured to eject a cleaning liquid to a nozzle surface of a head; and a suction part formed in the body and configured to suck the cleaning liquid ejected from the ejection part and used for cleaning the nozzle surface of the head and foreign substances separated from the nozzle surface of the head; and wherein the ejection part comprises a perpendicular passage through which the cleaning liquid flows and a discharge end at the end of the perpendicular passage and configured to guide the cleaning liquid to eject toward the suction part.

Furthermore, a central body further provided between the ejection unit and the suction unit. A surface of the central body, which faces the opposite side of the side of the nozzle surface of the head, may be a flat surface.

Furthermore, the body may include a first block provided on a first side of the central body, and the ejection unit may be provided between the central body and the first block.

Furthermore, a discharge end may include a first curved surface formed on a first side surface of the block, which faces one surface of the central body, to be curved toward the suction part, and a second curved surface formed on one surface of the central body to be curved toward the suction part.

Furthermore, the ejection unit may be a slot shape or a hole shape.

Furthermore, the body may include a second block provided on an opposite side of the central body, and the suction unit may be provided between the central body and the second block.

Furthermore, the suction unit may be provided perpendicularly to the opposite side of the direction the cleaning liquid is provided at the inside surface of the second block.

Furthermore, the inlet of the suction unit may be curved toward the ejection unit, so that the flow of cleaning liquid used for cleaning the nozzle surface of the head and foreign substances separated from the nozzle surface of the head may be led toward the side of the suction unit.

Furthermore, the inkjet head cleaning device may further include an air providing unit that provides compressed air, a cleaning liquid providing unit that provides the cleaning liquid, and a mixing unit that mixes the compressed air and the cleaning liquid, which are received from an air providing unit and the cleaning liquid providing unit, to generate a binary fluid.

Furthermore, the binary fluid generated in the mixing unit may be included in the ejection unit.

Furthermore, the inkjet head cleaning device may provide compressed air or cleaning liquid to the mixing unit.

Furthermore, the suction unit may further include a vacuum pump providing suction force to the suction unit.

Furthermore, the height of the central body is controlled by the body.

According to another aspect of exemplary embodiments of the inventive concept, the liquid crystal applying apparatus comprises: a plurality of inkjet heads each having a nozzle surface that receives a liquid crystal and discharges the liquid crystal to an upper surface of a target; a driving unit configured to move the inkjet heads in at least one direction; and a head cleaning device configured to remove the liquid crystal that resides on the nozzle surface of each of the inkjet heads, wherein the head cleaning device includes: a body; an ejection unit formed in the body, and configured to eject a cleaning liquid on a nozzle surface of a head; and a suction unit formed in the body, and configured to suction the cleaning liquid used for cleaning the nozzle surface of the head ejected from the ejection unit and foreign substances separated from the nozzle surface of the head, the ejection unit, including a discharge end to guide the cleaning liquid to eject in a perpendicular channel where the cleaning liquid flows perpendicularly, and in a direction facing the suction unit at the end of the perpendicular channel.

Furthermore, a central body is placed between the ejection unit and the suction unit, the side of the central body which faces the opposite side of the nozzle surface of the head may be a flat surface.

Furthermore, the body may include a first block provided centering on a first side of the central body, and a second block provided on an opposite side centering on the central body, the ejection unit may be provided between the central body and the first block, and the suction unit may be provided between the central body and the second block.

Furthermore, the discharge end may include a first curved surface formed on a first side surface of the block, which faces the opposite side of one surface of the central body, to be curved toward the suction part, and a second curved surface formed on the one surface of the central body to be curved toward the suction part.

Furthermore, the suction unit may be provided at the opposite side of the direction of where the cleaning liquid is provided, which is the inside surface of the second block, or the inlet may be curved toward the ejection unit.

Furthermore, the inkjet head cleaning device may include an air providing unit that provides compressed air, a cleaning liquid providing unit that provides a cleaning liquid, and a mixing unit that generates a binary fluid by mixing the compressed air and the cleaning liquid provided from the air providing unit and the cleaning providing unit.

Furthermore, the binary fluid generated in the mixing unit may be provided to the ejection unit.

According to some embodiments, a head cleaning device and a substrate treatment apparatus including the same perfectly remove fine liquid crystals remaining on the head.

According to some embodiments, a head cleaning device and a substrate treating apparatus including the same improves head cleaning process efficiency.

According to some embodiments, damaging of the nozzle surface by the cleaning liquid can be prevented.

According to some embodiments, the binary fluid, a mixture of compressed air and cleaning liquid, could easily eliminate remaining ink on the surface of the nozzle of the head by quick and strong pressure, thereby enhancing cleaning efficiency.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
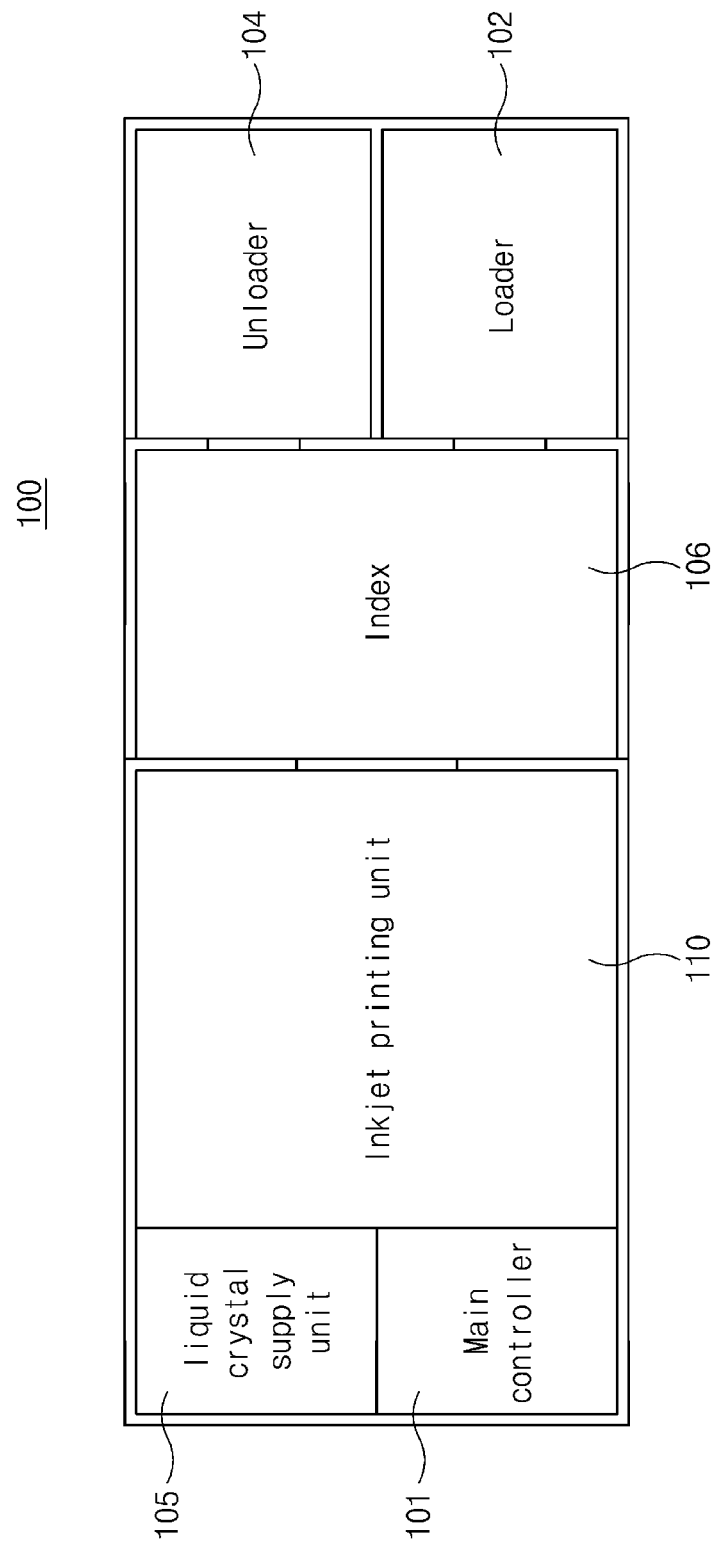
FIG. 1 schematically shows a liquid crystal applying apparatus according to embodiments of the inventive concept.

The inventive concept may be variously modified and may have various forms, and specific embodiments thereof will be illustrated in the drawings and described in detail. However, the embodiments according to the concept of the inventive concept are not intended to limit the specific disclosed forms, and it should be understood that the present inventive concept includes all transforms, equivalents, and replacements included in the spirit and technical scope of the inventive concept. In a description of the inventive concept, a detailed description of related known technologies may be omitted when it may make the essence of the inventive concept unclear.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Hereinafter, exemplary embodiments of the inventive concept will be described with reference to the accompanying drawings, and in a description of the inventive concept, the same reference numerals are given to the same or corresponding elements regardless of the reference numerals and a repeated description thereof will be omitted.

Hereinafter, a facility that applies a treatment liquid to a target in an inkjet manner of discharging liquid droplets, and a method for applying a treatment liquid to the target by using the facility will be described.

For example, the target may be a color filter (CF) substrate or a thin film transistor (TFT) substrate of a liquid crystal display panel, and the treatment liquid may be a liquid crystal, an alignment liquid, red (R), green (G), blue (B) inks, in which pigment particles are mixed in a solvent. Polyimide may be used as the alignment liquid.

The alignment liquid may be applied onto upper surfaces of the color filter (CF) substrate and the thin film transistor (TFT) substrate, and the liquid crystal may be applied onto an upper surface of the color filter (CF) substrate or the thin film transistor (TFT) substrate. The ink may be applied to an inner area of a black matrix which are arranged as a grid pattern on the color filter (CF) substrate.

Although a facility that uses a liquid crystal as the treatment liquid will be described as an example in the present embodiment, the technical spirit of the inventive concept is not limited thereto.

FIG. 1 shows schematically a liquid crystal applying apparatus according to exemplary embodiments of the inventive concept.

Referring to FIG. 1, a liquid crystal applying apparatus 100 comprises an inkjet printing unit 110 according to the inventive concept, as a facility that applies a liquid crystal onto an upper surface of a target (not shown) in an inkjet manner. The target includes a glass substrate for manufacturing a color filter, an alignment film, and the like of a rectangular panel, for example, a liquid crystal panel, a printed circuit board for forming a metallic thin film on a circuit pattern, and a plate for printing a liquid crystal in an inkjet manner. In the following exemplary embodiment of the inventive concept, a glass substrate "S" for manufacturing a color filter as the target will be described in detail.

The liquid crystal applying apparatus 100 may comprise an inkjet printing unit 110 that prints inks onto a surface of a substrate in an inkjet manner, a loader 102 on which a plurality of substrates is loaded, an index 106 that takes out the substrates from the loader 102 to supply the extracted substrates to the inkjet printing unit 110, and an unloader 104 that unloads the substrates to which a liquid crystal has been completely applied.

The index 106 may include a transferring robot (not shown) that transfers the substrates between the loader 102, the inkjet printing unit 110, and the unloader 104. The liquid crystal applying apparatus 100 comprises a liquid crystal supply unit 105 that supplies the liquid crystal to the inkjet printing unit 110. The liquid crystal applying apparatus 100 further comprises a main controller 101 that controls an overall operation of the liquid crystal applying apparatus 100 as an electric part controller.

Figure 2:
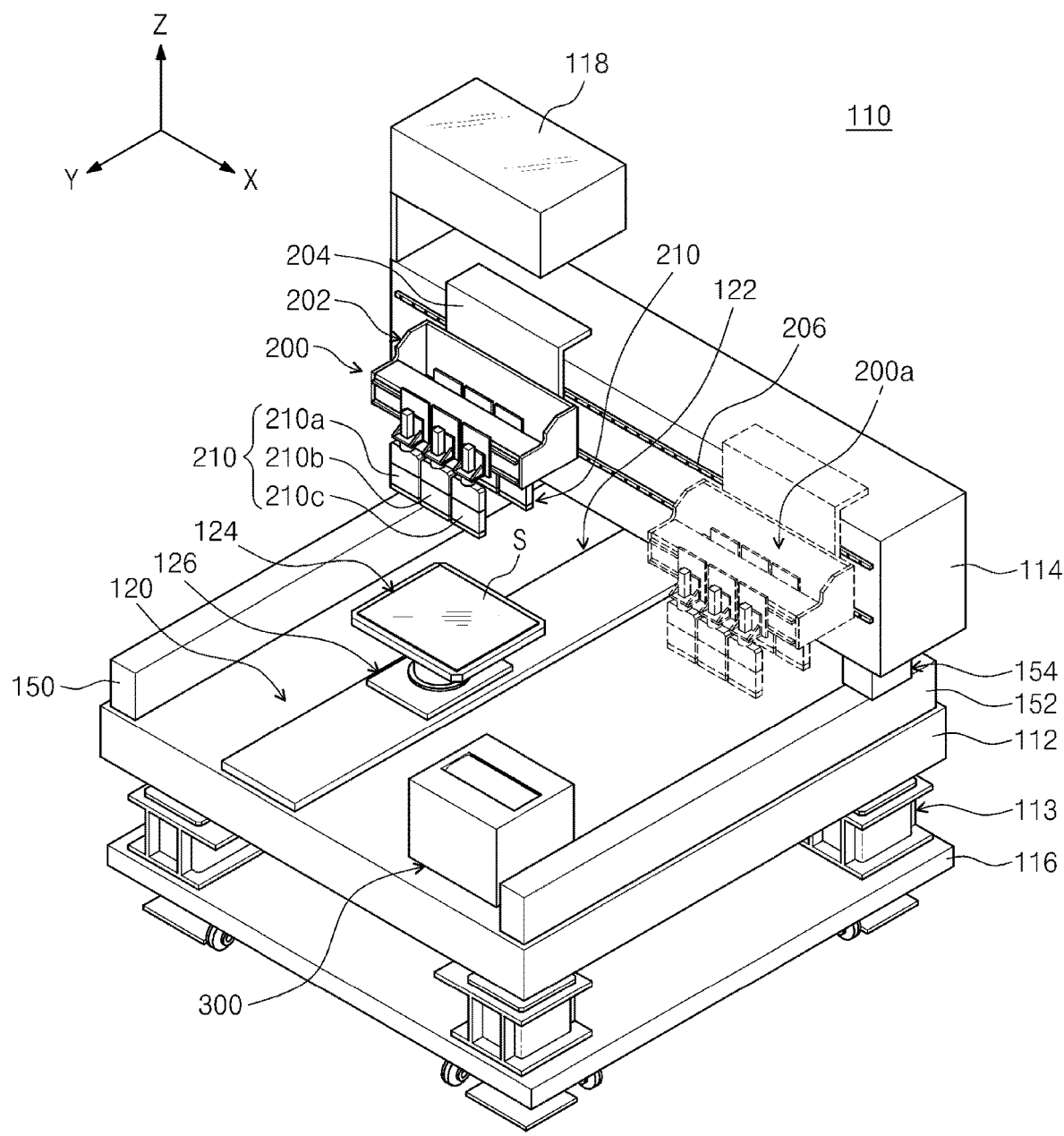
FIGS. 2 and 3 show a configuration of an inkjet printing unit.
Figure 3:
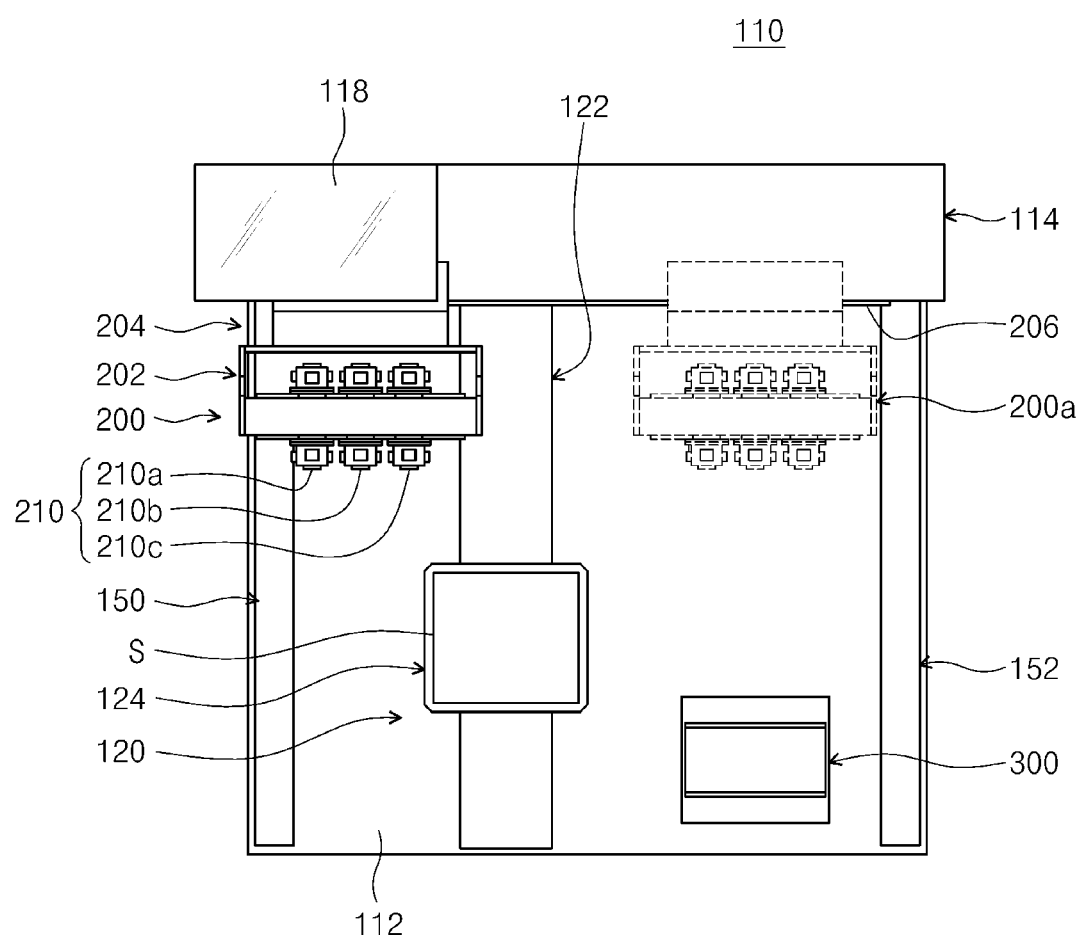

FIGS. 2 and 3 shows in detail a configuration of an inkjet printing unit.

Referring to FIGS. 2 and 3, the inkjet printing unit 110 is an apparatus that applies the liquid crystal onto a surface of the substrate "S" in the inkjet manner, and may include a base 116 of a steel material, a stage 112 disposed on the base 116, a head assembly 200 disposed above the stage 112 and including a plurality of inkjet heads 210 that apply the liquid crystal onto the surface of the substrate "S" seated on the stage 112, and a gantry 114 that supports the head assembly 200. Furthermore, the inkjet printing unit 110 may comprise a plurality of anti-vibration members 113 for preventing vibration between the base 116 and the stage 112.

The head assembly 200 may be a multi-head array (MHA) unit. The head assembly 200 may include a plurality of inkjet heads 210 (210a to 210c) that discharge the liquid crystal in the inkjet manner, a bracket 202 in which the inkjet heads 210 are installed, and a driving unit 204 that is coupled to the bracket 202 to move the head assembly 200 in at least one direction.

A plurality of inkjet heads 210, for example, may be installed in two rows on front and rear sides of the bracket 202. That is, the plurality of inkjet heads 210 are disposed side by side on the front and rear sides of the bracket 202 in a Y axis direction. Each of the inkjet heads 210 is connected to a liquid crystal supply unit 105 (see FIG. 1) to receive the liquid crystal. The inkjet heads 210 may receive the same or different liquid crystals.

The inkjet head 210 is an apparatus that discharges the liquid crystals onto a surface of the substrate "S", and a head is provided at a lower end of each of the inkjet heads 210. The head has a nozzle surface provided with a plurality of nozzles (not shown) that supply the liquid crystal to the substrate "S", on a lower surface thereof, which faces the surface of the substrate "S". The nozzles may independently discharge the liquid crystal to the substrate "S".

When the target is the substrate "S" for color filters, each of the inkjet heads 210 supplies any one of the liquid crystals of color "R", color "G", or color "B". Herein, the liquid crystals are inks of color "R", color "G", and color "B". The inkjet heads 210 that supply the liquid crystals of color R, color G, and color B, respectively are disposed to be adjacent to each other.

The driving unit 204 includes first guide members 150 and 152 for moving the head assembly 200 in a first direction, a second guide member 206 which is coupled with a bracket 202 to which the inkjet heads 210 are installed for moving the head assembly 200 in a second direction, and a driver (not shown). The bracket 202 is moved in the first direction (that is, the Y axis) along the first guide members 150 and 152, and/or the second direction (that is, the X axis) along the second guide member 206. Furthermore, the driving unit 204 can move the head assembly 204 in a third direction (that is, the Z axis). Furthermore, the driving unit 204 can rotate the inkjet heads 210 about central axes thereof.

The stage 112 is provided with a flat table, and includes a chucking part 120 and a head cleaning apparatus 300. The chucking part 120 is placed on the stage 112. The head cleaning apparatus 300 may clean the head assembly 200. The chucking unit 120 includes a chuck 124, a chuck driving part 126 and a third guide member 122. The chuck 124 linearly moves toward the index 106 to receive the substrate "S", chucks the substrate "S" when the substrate "S" is seated thereon, and moves backward the index 106 to a location at which the liquid crystal is to be applied onto the substrate "S". The chuck driver 126 moves the chuck 124 in at least one linear direction and/or rotates the chuck 124. The third guide member 122 guides the chuck 124 such that the chuck 124 moves linearly. A lower portion of the chuck 124 is coupled to the chuck driver 126 and the chuck 124 linearly moves along the third guide member 122 in the Y axis direction.

The first guide members 150 and 152 are installed on the stage 112 at two opposite ends of the gantry 114. The first guide members 150 and 152 extend along the Y axis direction and have the same dimension as the stage 112 in the Y axis direction. The first guide members 150 and 152 are provided long at opposite ends of the upper side of the stage 112 along the Y axis direction and linearly move the gantry 114 in the Y axis direction.

The gantry 114 is coupled to the driving unit 204 at one lateral side thereof and coupled to the sliders 154 at two opposite ends of the bottom side thereof so that the head assembly 200 can move in the Y axis or X axis direction. To achieve this, the gantry 114 includes the second guide member 206 for the head assembly 200 to linearly move in the X axis direction, and a driving device (not shown) (for example, a motor, a gear, a pulley, a belt, a ball screw, and a linear motor) for driving the driving unit 204 to move along the second guide member 206. A pressure controller 118 that controls an overall operation of the inkjet printing unit 110, for example, adjustment of pressure, supply of the liquid crystal, and discharge of the liquid crystal is installed on a top side of the gantry 114. The gantry 114 has the same dimension as the stage 112 in the X axis direction. That is, the gantry 114 is coupled the sliders 154 at two opposite ends of the bottom side thereof, and the slider 154 moves in the Y axis direction along the first guide members 150 and 152. Further, the gantry 114 can move the bracket 202 linearly in the X axis direction, so that the inkjet heads 210 can move in the X axis direction.

The pressure controller 118 includes a meniscus pressure control (MPC) unit that controls an internal pressure of the inkjet head 210. For example, when supplying liquid crystals, the pressure controller 118 controls the internal pressure of the inkjet head 210 to a negative pressure and individually controls a plurality of piezoelectric elements (not shown) such that the liquid crystals can be discharged uniformly form each nozzle.

In order to clean the inkjet head 210, the inkjet printing unit 110 moves the head assembly 200 to a location 200a corresponding to the cleaning part.

The cleaning part (maintenance zone) is provided with a head cleaning apparatus 300. For cleaning the inkjet head 210, the head assembly 200 is moved by the driving unit 204 in the X axis and the head cleaning apparatus 300 moves the inkjet head 210 in the Y axis direction such that the inkjet head 210 is located above a head cleaning apparatus. The inkjet head 210 moves linearly over the liquid crystal cleaning apparatus whereby the liquid crystal residing on the nozzle surfaces of the heads 210 can be removed in a non-contact manner.

In this way, the head cleaning apparatus 300 may remove the liquid crystal that resides on the nozzle surfaces of the heads in the non-contact manner.

Figure 4:
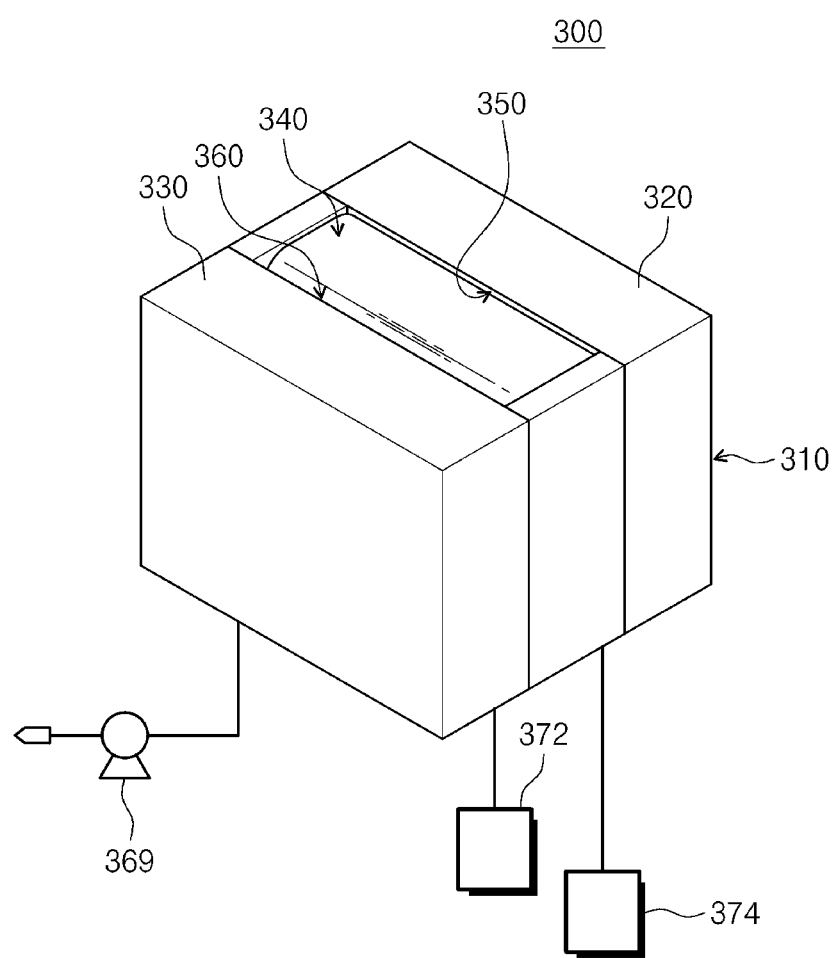
FIG. 4 is a perspective view illustrating a head cleaning apparatus.
Figure 5:
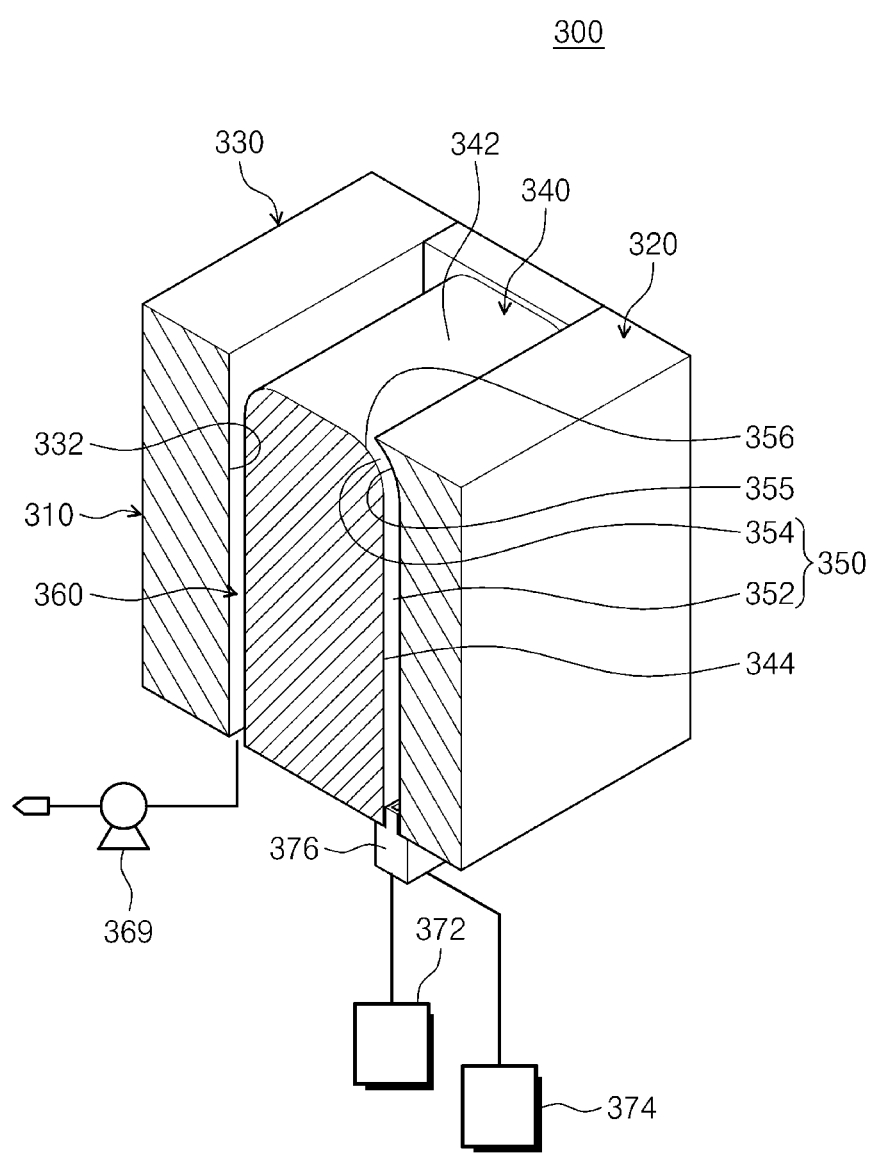
FIG. 5 is a partially sectional perspective view of the head cleaning apparatus illustrated in FIG. 4.
Figure 6A:
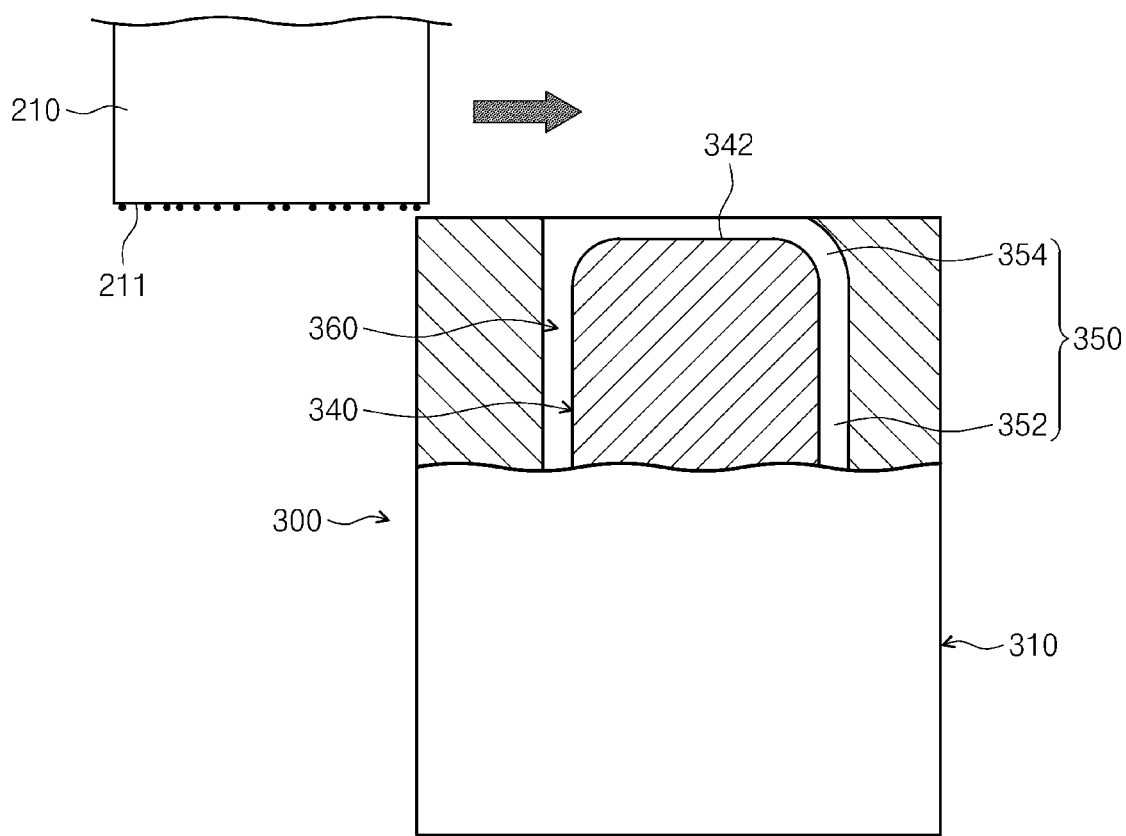
FIGS. 6A and 6B illustrate a head cleaning process in a head cleaning apparatus.
Figure 6B:
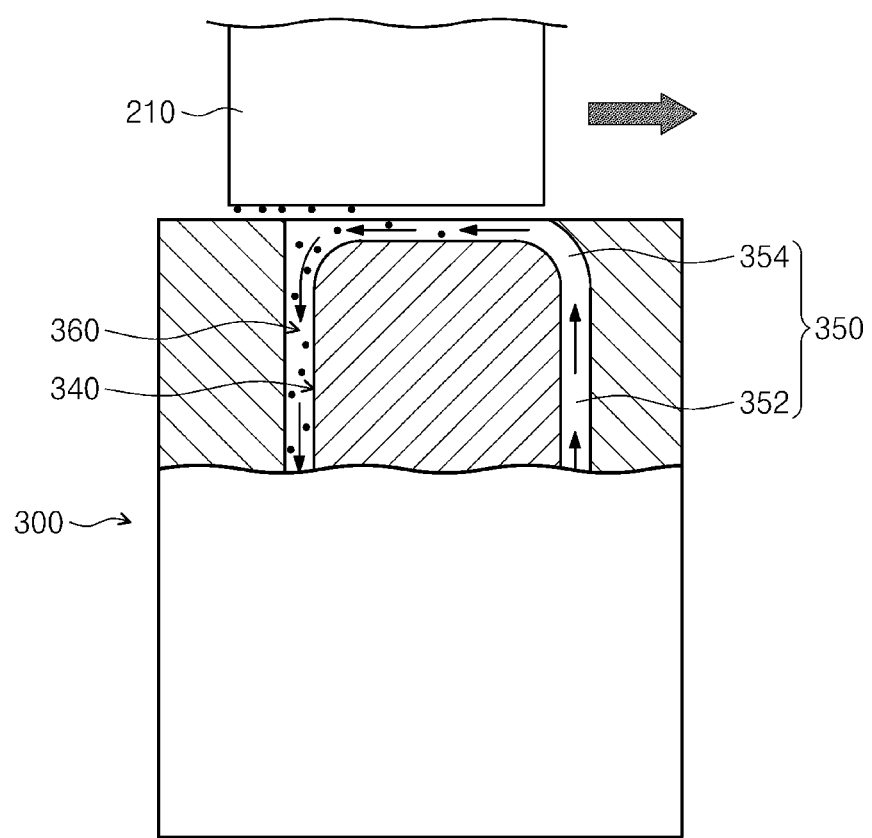

FIG. 4 is a perspective view illustrating a head cleaning apparatus. FIG. 5 is a partially sectional perspective view of the head cleaning apparatus illustrated in FIG. 4. FIGS. 6A and 6B are views illustrating a head cleaning process in the head cleaning apparatus.

Referring to FIGS. 4 to 6B, the head cleaning apparatus 300 may include a body 310, an ejection part 350, and a suction part 360.

The body 310 may include a first block 320, a second block 330, and a central body 340 provided therebetween. The ejection part 350 and the suction part 360 may be provided on the body 310.

Figure 8:
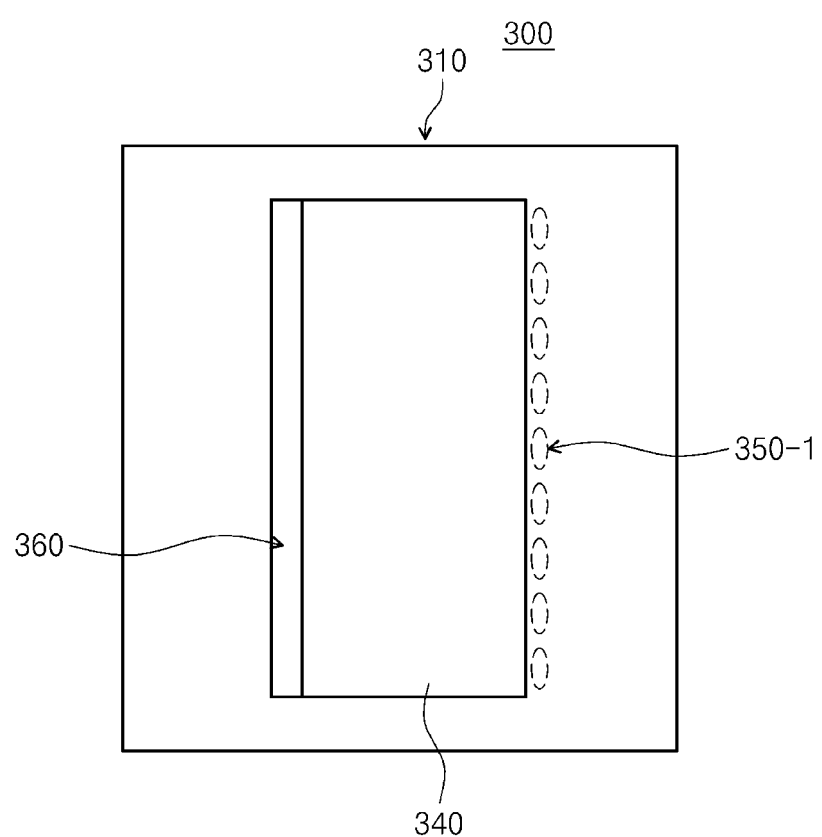
FIG. 8 shows another example of an ejection unit.

The ejection part 350 may eject a cleaning liquid for removing foreign substances (residual liquid crystals) that reside on the nozzle surface of the heads 210. The ejection part 350 may be provided in a slot between (defined by) the first block 320 and the central body 340. The ejection part 350 may include a vertical passage 352, and a discharge end 354 formed at an end (e.g., top end) of the vertical passage 352. The cleaning liquid may be supplied through a mixing unit 376 connected to a bottom end of the vertical passage 352, and the cleaning liquid is ejected to an upper surface of the central body 340 through the discharge end 354 after passing through the vertical passage 352. Although it is illustrated in the present embodiment that the ejection part 350 is provided in the shape of the slot (slot-type ejection part 350), the inventive concept is not limited thereto, but as illustrated in FIG. 8, a hole-type ejection unit 350-1 may be provided.

The discharge end 354 may guide the cleaning liquid such that the cleaning liquid is ejected toward the suction part 360. As an example, the discharge end 354 includes a first curved surface 355 formed on a first side surface (a side surface that faces the central body) of the first block 320 to be curved toward the suction part 360, and a second curved surface 356 formed on a first side surface 344 (a side surface that faces the first block) of the central body 340 to be curved toward the suction part 360.

A compressed air and a cleaning liquid may be provided to the ejection part 350. A compressed air may be provided through an air providing part 372. The cleaning liquid may be provided through a cleaning liquid providing part 374. The compressed air and the cleaning liquid provided from the air providing part 372 and the cleaning liquid providing part 374 respectively, may be mixed in a mixing unit 376 and may be provided to the ejection part 350 in a form of a binary fluid. The compressed air and the cleaning liquid may be selectively supplied to the mixing unit 376.

The suction part 360 may be formed on the body 310. The suction part 360 may suck the cleaning liquid that is ejected by the ejection part 350 and is used for cleaning the nozzle surface of the head, and foreign substances that are removed from the nozzle surface of the heads. The suction part 360 may be provided in a slot between (e.g., defined by) the central body 340 and the second block 330. The suction part 360 is formed such that an inner surface 332 of the second block 330 is vertical. The inner surface 332 may face the central body 340. The inner surface 332 may be a vertical wall. The inner surface 332 may be a side facing the inner surface of the first block 320 defining the vertical passage 352. A vacuum pump 369 may provide a suction force to the suction part 360.

Meanwhile, it is characterized that an upper surface 342 of the central body 340 which faces the nozzle surface of the head 210, is a flat surface. The central body 340 having such structure is characterized in that the flat upper surface 342 of the central body 340 and the flat surfaces of the nozzles of the head 210 define a narrow linear passage (though which the cleaning liquid passes) and thereby the cleaning liquid ejected from the ejection part 350 can flow horizontally without spreading (turbulent) to the suction part 360.

The head cleaning apparatus 300 having the above configuration may minimize an impact caused by the cleaning liquid thereby preventing damage to nozzle surfaces by ejecting the cleaning liquid at substantially horizontally relative to the nozzle surfaces. When the cleaning liquid is ejected substantially vertically to the nozzle surface, the cleaning liquid may impact the nozzle surfaces, thereby damaging the nozzle surfaces.

Furthermore, cleaning efficiency may be improved by the binary fluid, a mixture of compressed air and cleaning liquid, which remover or falling off the ink residing on the nozzle surface of the head with quickness and strong pressure.

Figure 7:
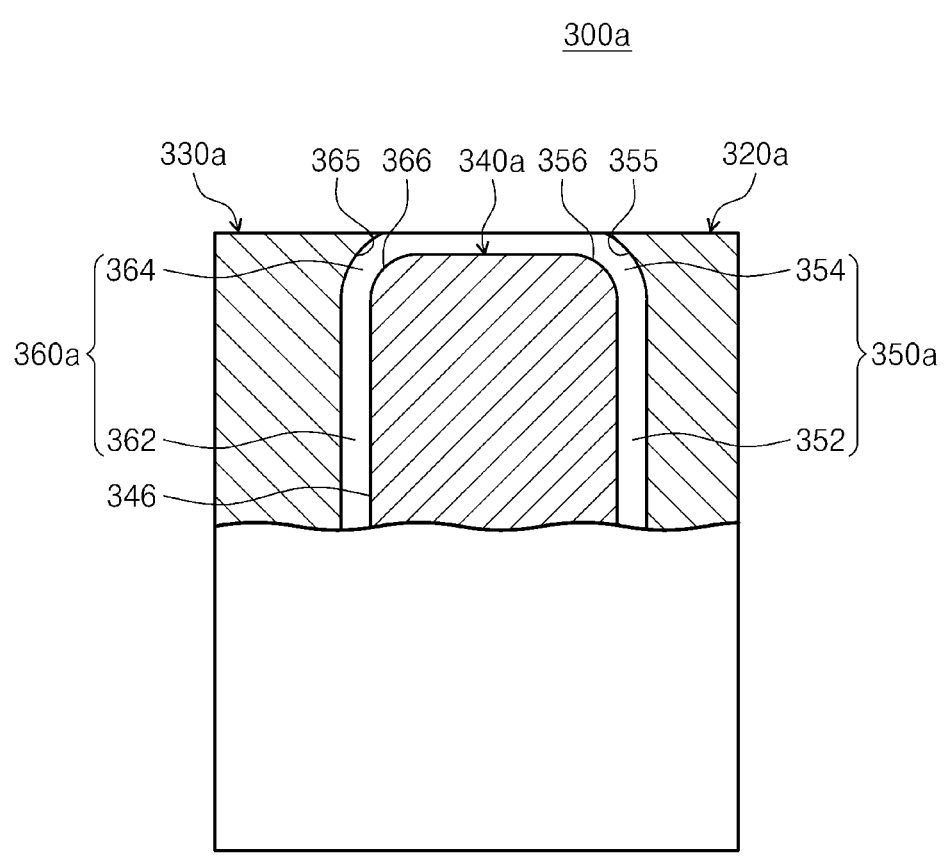
FIG. 7 shows a first modification of the head cleaning apparatus.

FIG. 7 is a view illustrating a first modified embodiment of the head cleaning apparatus.

As illustrated in FIG. 7, a head cleaning apparatus 300a according to the modified embodiment includes a body 310a, a first block 320a, a second block 330a, a central body 340a, an ejection part 350, and a suction part 360, which have similar configurations and functions as those of the body 310, the first block 320, the second block 330, the central body 340, the ejection part 350, and the suction part 360 illustrated in FIG. 5, and thus a difference would be described.

The modified embodiment shown in FIG. 7 differs from embodiments shown in FIG. 5 in that an inlet (suction end) of the suction part 360a is curved toward the ejection unit. The suction part 360a includes an inlet 364 and an exhaust passage 362. The exhaust passage 362 includes an inlet 364 and an exhaust passage 362. The inlet 364 includes (e.g., is defined by) a third curved surface 365 of the second block 330a (an inner surface of the second block surfacing the central body) and a fourth curved surface 366 of the central body 340 (an outer surface of the central body facing the second block). The third curved surface 365 and the fourth curved surface 366 may be formed to be curved toward the ejection part 360.

In this way, the cleaning liquid used for cleaning the nozzle surface of the head and the foreign substances removed from the nozzle surface of the head may be stably exhausted through the curved inlet 364 of the suction unit 360a.

Figure 9:
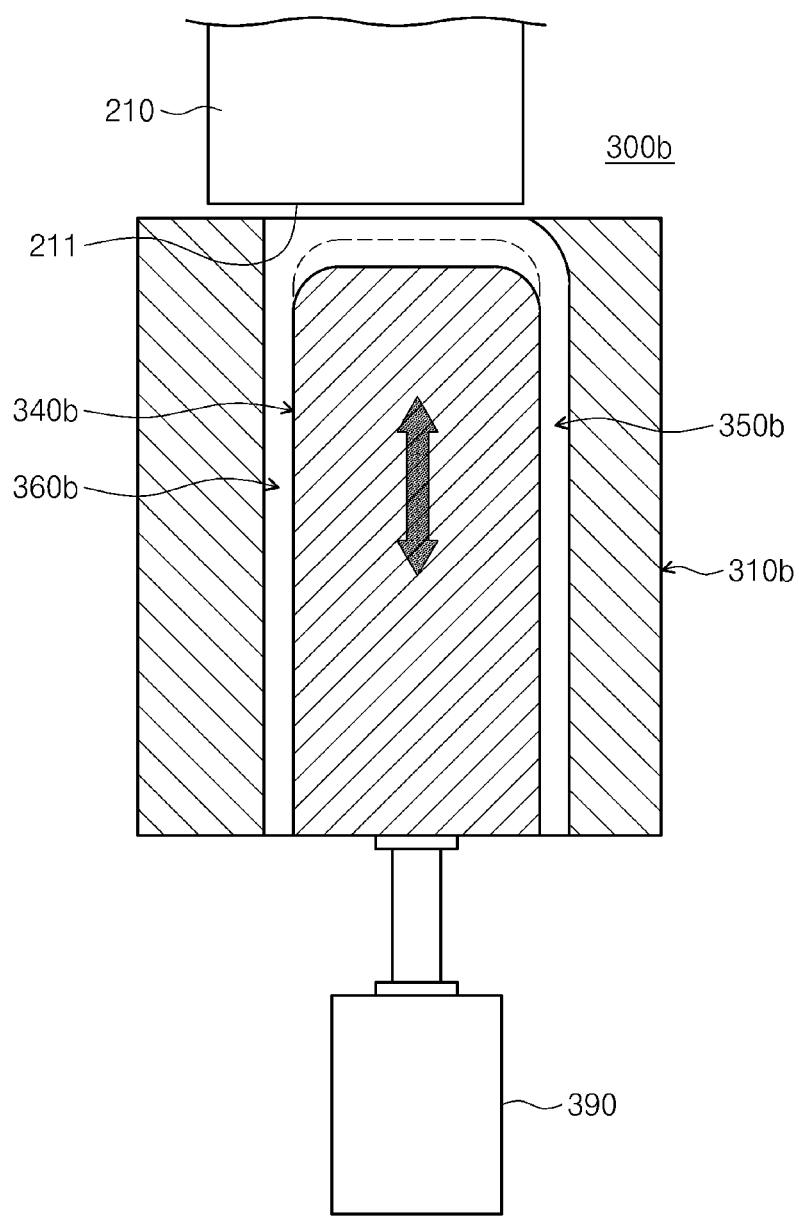
FIG. 9 shows a second modification of the head cleaning apparatus.

FIG. 9 is a view illustrating a second modified embodiment of the head cleaning apparatus.

Referring to FIG. 9, a head cleaning apparatus 300b according to this modified embodiment includes a body 310b, a first block 320b and a second block 330b, a central body 430b, an ejection part 350b and a suction part 360b, which are provided in a similar structure and function to the body 310, the first block 320 and the second block 330, the central body 430, the ejection part 350 and the suction part 360 illustrated in FIG. 5. Therefore, the modified embodiment will be explained hereinafter based on the differences to FIG. 5.

In this modified embodiment, the height of the central body 340b is controlled at the body 310b. The central body 340b may be lifted or lowered according to a lifting and lowering device 390. When the central body 340b is lifted, the space or gap between the nozzle surface of the head 210 and the upper surface 342 of the central body 340 decreases, and accordingly the velocity of the flow of the cleaning liquid passing through the passage may increase. On the other hand, when the central body is lowered, the gap between the nozzle surface of the head 210 and the upper surface 342 of the central body 340 increases, and accordingly the velocity of the flow of the cleaning liquid passing through the passage may decrease.

The effects of the inventive concept are not limited to the above-described ones. Unmentioned effects will be clearly understood from the specification and the accompanying drawings by those skilled in the art to which the inventive concept pertains.

The above description is a simple exemplification of the technical spirits of the inventive concept, and the inventive concept may be variously corrected and modified by those skilled in the art to which the inventive concept pertains without departing from the essential features of the inventive concept. Accordingly, the embodiments disclosed in the inventive concept is not provided to limit the technical spirits of the inventive concept but provided to describe the inventive concept, and the scope of the technical spirits of the inventive concept is not limited by the embodiments. Accordingly, the genuine technical scope of the inventive concept should be construed by the attached claims, and all the technical spirits within the equivalent ranges fall within the scope of the inventive concept.

What is claimed is:

1. An inkjet head cleaning device comprising:
    a body;
    an ejection part formed in the body, and configured to eject a cleaning liquid to a nozzle surface of a head;
    a suction part formed in the body, and configured to suck the cleaning liquid ejected from the ejection part and used for cleaning the nozzle surface of the head, and foreign substances separated from the nozzle surface of the head; and
    a central body provided between the ejection part and the suction part, the central body having a flat surface that faces the nozzle surface of the head,
    wherein the ejection part includes:
    a vertical passage through which the cleaning liquid flows and a discharge end at the end of the vertical passage and configured to guide the cleaning liquid to eject toward the suction part,
    wherein the body includes:
    a first block provided at a first side of the central body, and wherein the ejection part is provided between the central body and the first block; and
    a second block provided at a second side of the central body, and wherein the suction part is provided between the central body and the second block;
    wherein an inner surface of the second block which defines the suction part is placed facing an inner surface of the first block which defines the vertical passage based on the central body, and the suction part is formed such that the inner surface of the second block is vertical, and
    wherein the discharge end of the ejection part includes a first curved surface formed at a first side surface of the first block to be curved toward the suction part, the first side surface of the first block faces a first side surface of the central body, and a second curved surface formed at the first side surface of the central body to be curved toward the suction part.

2. The inkjet head cleaning unit of claim 1, further comprising a vacuum pump for providing suction force to the suction part.

3. The inkjet head cleaning unit of claim 1, wherein a height of the central body is controlled in the body.

4. The inkjet head cleaning device of claim 1, wherein the ejection part is provided in a slot shape or a hole shape.

5. The inkjet head cleaning device of claim 1, wherein an inlet of the suction part is curved toward the ejection part so that flows of the cleaning liquid used for cleaning the nozzle surface of the head and the foreign substances separated from the nozzle surface of the head may be led toward the suction part.

6. A inkjet head cleaning device comprising:
    a body;
    an ejection part formed in the body, and configured to eject a cleaning liquid to a nozzle surface of a head;
    a suction part formed in the body, and configured to suck the cleaning liquid ejected from the ejection part and used for cleaning the nozzle surface of the head, and foreign substances separated from the nozzle surface of the head;
    an air providing part configured to provide compressed air;
    a cleaning liquid providing part configured to provide cleaning liquid; and
    a mixing unit configured to mix the compressed air from the air providing part and the cleaning liquid from the cleaning liquid providing part to generate a binary fluid,
    wherein the ejection part includes a vertical passage through which the cleaning liquid flows and a discharge end at the end of the vertical passage and configured to guide the cleaning liquid to eject toward the suction part.

7. The inkjet head cleaning device of claim 6, wherein the binary fluid generated in the mixing unit is provided to the ejection part.

8. The inkjet head cleaning device of claim 6, wherein the inkjet head cleaning device provides either compressed air or cleaning liquid to the mixing unit.

* * * * *